US012620896B2

(12) United States Patent
Huang et al.

(10) Patent No.: US 12,620,896 B2
(45) Date of Patent: May 5, 2026

(54) HIGH EFFICIENCY POWER CONVERSION CIRCUIT HAVING HIGH VOLTAGE TOLERANCE

(71) Applicant: Richtek Technology Corporation, Hsinchu (TW)

(72) Inventors: Tsung-Wei Huang, Taipei (TW); Ye-Sing Luo, Hsinchu (TW); Sheng-Kai Fan, Hsinchu (TW)

(73) Assignee: Richtek Technology Corporation, Hsinchu (TW)

( * ) Notice: Subject to any disclaimer, the term of this patent is extended or adjusted under 35 U.S.C. 154(b) by 412 days.

(21) Appl. No.: 18/336,010

(22) Filed: Jun. 15, 2023

(65) Prior Publication Data

US 2024/0186898 A1      Jun. 6, 2024

Related U.S. Application Data

(60) Provisional application No. 63/386,162, filed on Dec. 5, 2022.

(30) Foreign Application Priority Data

Apr. 18, 2023      (TW) ................................. 112114455

(51) Int. Cl.
| | |
|---|---|
| *H02M 1/32* | (2007.01) |
| *H02M 1/34* | (2007.01) |
| *H02M 3/07* | (2006.01) |
| *H02M 3/158* | (2006.01) |

(52) U.S. Cl.
CPC ............. *H02M 3/158* (2013.01); *H02M 1/32* (2013.01); *H02M 1/325* (2021.05); *H02M 1/34* (2013.01); *H02M 3/07* (2013.01)

(58) Field of Classification Search
CPC .......... H02M 3/158; H02M 3/07; H02M 1/32; H02M 1/325; H02M 1/34
See application file for complete search history.

(56) References Cited

U.S. PATENT DOCUMENTS

2023/0020108 A1 * 1/2023 Wang .................. H02M 1/4233

FOREIGN PATENT DOCUMENTS

| | | | | |
|---|---|---|---|---|
| JP | 2004111604 A | * | 4/2004 | |
| JP | 2022015734 A | * | 1/2022 | |
| WO | WO-2023181361 A1 * | | 9/2023 | .............. H02M 3/28 |

* cited by examiner

*Primary Examiner* — Monica Lewis
*Assistant Examiner* — Jye-June Lee
(74) *Attorney, Agent, or Firm* — Huan-Yi Lin

(57) ABSTRACT

A power conversion circuit converting power between a bus voltage at a bus node and a first voltage at a first node includes: a bus switch coupled between the bus node and a second node which has a second voltage; plural conversion switches coupled, with at least one conversion capacitor, to the first node and the second node. In a power conversion mode, the plural conversion switches convert a power between the second voltage and the first voltage via a switched capacitor power conversion method, and plural sub-clamp circuits respectively clamping a drain-gate voltage of respective switch of a group of switches to not exceed a drain-gate clamp voltage, so that when the bus node is applied with a bus maximum rating voltage, respective drain-source voltages of the bus switch and the respective switch in the respective corresponding plural conversion switches are smaller than a corresponding breakdown voltage.

14 Claims, 11 Drawing Sheets

1

HIGH EFFICIENCY POWER CONVERSION CIRCUIT HAVING HIGH VOLTAGE TOLERANCE

CROSS REFERENCE

The present invention claims priority to U.S. 63/386,162 filed on Dec. 5, 2022 and claims priority to TW 112114455 filed on Apr. 18, 2023.

BACKGROUND OF THE INVENTION

Field of Invention

The present invention relates to a power conversion circuit; particularly, it relates to such power conversion circuit having high voltage tolerance and such power conversion circuit capable of maintaining high efficiency.

Description of Related Art

Please refer to FIG. 1A and FIG. 1B. FIG. 1A shows a schematic diagram of a conventional power conversion circuit, whereas, FIG. 1B shows a schematic diagram of another conventional power conversion circuit. Each of the conventional power conversion circuit 910 of FIG. 1A and the conventional power conversion circuit 920 of FIG. 1B includes: plural conversion switches M0~M4. Each of the conventional power conversion circuit 910 of FIG. 1A and the conventional power conversion circuit 920 of FIG. 1B is configured to perform power conversion between a voltage VBS and a voltage VO. The plural conversion switches M0~M4 are configured to periodically switch a capacitor C1, thereby performing power conversion between a voltage V1 and the voltage VO via a switched capacitor power conversion method, wherein the switch M0 functions as a path switch. In a common practical application, because an absolute maximum ratings (AMR) of the voltage VBS can undesirably reach for example 22 volts (V), the prior arts adopt lateral diffused MOS (LDMOS) transistor capable of withstanding high voltage to overcome this major drawback.

In the conventional power conversion circuit 910 shown in FIG. 1A, the switch M1 is designed as a LDMOS transistor. In a sleep mode, the switches M0~M4 are all OFF. Because a body diode of the switch M0 has a configuration of being forward-coupled (i.e., a current input terminal is coupled to the voltage VBS), the switch M1 will unwantedly suffer a high voltage resulted from the voltage VBS. As a consequence, in this case, it is required for the switch M1 to be designed as the LDMOS transistor having a breakdown voltage up to 24V, such that the switch M1 will be able to withstand the AMR of the voltage VBS equal to 22V.

In the conventional power conversion circuit 920 shown in FIG. 1B, the switch M0 is designed as a LDMOS transistor. In a sleep mode, the switches M0~M4 are all OFF. Because a body diode of the switch M0 has a configuration of being reverse-coupled (i.e., the current output terminal is coupled to the voltage VBS), the switch M0 will unwantedly suffer the high voltage resulted from the voltage VBS. As a consequence, in this case, it is required for the switch M0 to be designed as the LDMOS transistor having a breakdown voltage equal to 24V, such that the switch M0 will be able to withstand the AMR of the voltage VBS up to 22V.

The prior art power conversion circuit 910 shown in FIG. 1A and the prior art power conversion circuit 920 shown in FIG. 1B have the following drawbacks: although the prior arts shown in FIG. 1A and FIG. 1B can withstand the AMR through adopting a LDMOS transistor, nevertheless, because a high voltage device (e.g., a LDMOS transistor) usually has a relatively greater ON resistance, ON power loss will be undesirably increased, thus unwantedly reducing charging efficiency. From another perspective, with a predetermined target ON resistance, the manufacturing cost will be undesirably increased.

SUMMARY OF THE INVENTION

From one perspective, the present invention provides a power conversion circuit, which is configured to operably perform power conversion between a bus voltage at a bus node and a first voltage at a first node; the power conversion circuit comprising: a bus switch, which is coupled between the bus node and a second node, wherein the second node has a second voltage; a plurality of conversion switches coupled, with at least one conversion capacitor, to the first node and the second node, wherein in a power conversion mode, the bus switch is turned ON, and t the plurality of the conversion switches are configured to operably switch the at least one conversion capacitor and periodically, thereby power conversion between the second voltage and the first voltage via a switched capacitor power conversion method is performed; and a clamp circuit which includes a plurality of sub-clamp circuits, wherein the respective plurality of sub-clamp circuits are configured to operably clamp respective drain-gate voltages of respective corresponding switches of a group of switches, so that respective drain-gate voltages of the respective corresponding switches of the group of switches do not exceed respective corresponding drain-gate clamp voltages, wherein the group of switches include the bus switch and at least one of the plurality of the conversion switches, so that when the bus node is applied with a bus maximum rating voltage, respective drain-source voltages of the bus switch and the respective corresponding plurality of conversion switches are smaller than a corresponding breakdown voltage; wherein the bus maximum rating voltage is higher than the respective breakdown voltage of the bus switch and the respective corresponding plurality of conversion switches.

In one embodiment, the group of switches are sequentially coupled in series.

In one embodiment, the respective breakdown voltages of the bus switch and the respective corresponding plurality of conversion switches are of a same level, wherein the group of switches include k switches, wherein k is a quotient of the bus maximum rating voltage divided by a drain-source clamp voltage and k is a positive integer, wherein the drain-source clamp voltage is defined as: the respective drain-source voltages of the respective corresponding switches of the group of switches in a situation where the respective drain-gate voltages of the respective corresponding switches of the group of switches are clamped at the drain-gate clamp voltage.

In one embodiment, the breakdown voltage is smaller than ½ of the bus maximum rating voltage.

In one embodiment, when one switch of the group of switches is clamped at the drain-gate clamp voltage by the clamp circuit, the drain-gate voltage of the one switch of the group of switches is clamped at a sum of the drain-gate clamp voltage plus an ON threshold voltage of the drain-gate voltage of the one switch of the group of switches, such that the drain-gate voltage of the one switch of the group of switches is smaller than the breakdown voltage.

In one embodiment, at least one of the plurality of the sub-clamp circuits includes: at least one diode or at least one diode-connected transistor having its gate and drain being electrically connected to each other, wherein the drain-gate clamp voltage is correlated with a forward voltage of the at least one diode, a reverse breakdown voltage of the at least one diode or an ON threshold voltage of the at least one diode-connected transistor.

In one embodiment, the at least one diode includes: a Zener diode having a reverse terminal coupled to a positive clamp terminal; and a reverse blocking diode having a forward terminal coupled to a forward terminal of the Zener diode and having a reverse terminal coupled to a negative clamp terminal; wherein the positive clamp terminal and the negative clamp terminal are coupled to a drain and a gate, respectively, of one switch of the group of switches, so as to clamp the drain-gate voltage of the one switch of the group of switches; wherein the reverse blocking diode is configured to operably cut off a current which occurs in a case where a voltage at the negative clamp terminal is higher than a voltage at the positive clamp terminal; wherein the drain-gate clamp voltage is correlated with a sum of a forward voltage of the reverse blocking diode plus a reverse breakdown voltage of the Zener diode.

In one embodiment, the power conversion circuit further comprises: a comparator, which is configured to operably compare the bus voltage with an over voltage threshold to generate a bias voltage switching signal; and a bias voltage switching circuit, which is configured to operably switch a body bias voltage of the bus switch according to the bias voltage switching signal, wherein when the bus voltage is higher than the over voltage threshold, the bias voltage switching circuit is configured to operably switch the body bias voltage to the bus voltage or else switch the body bias voltage to the second voltage.

In one embodiment, the plurality of the sub-clamp circuits include: a first bus sub-clamp circuit and a second bus sub-clamp circuit; wherein the first bus sub-clamp circuit is configured to operably clamp a voltage between the bus node and a gate of the bus switch, so as to clamp a voltage difference between the bus node and the second node to be smaller than a breakdown voltage of the bus switch; wherein the second bus sub-clamp circuit is configured to operably clamp a voltage between the second node and the gate of the bus switch, so as to clamp the voltage difference between the second node and the bus node to be smaller than the breakdown voltage of the bus switch.

In one embodiment, the plurality of the conversion switches include: a first high side switch, a second high side switch, a first low side switch and a second low side switch, four of which are connected in series between the second node and a ground node; wherein the at least one conversion capacitor includes a first conversion capacitor; wherein in the power conversion mode, the plurality of the conversion switches are configured to operably control a first end of the first conversion capacitor to periodically switch between the first node and the second node and control a second end of the first conversion capacitor to periodically switch between the first node and the ground node, such that in a steady state, a voltage across the first conversion capacitor is ½ of the second voltage and the first voltage is ½ of the second voltage.

In one embodiment, the at least one of the plurality of the conversion switches in the group of switches include one of following: the first high side switch; the first high side switch and the second high side switch; or the first high side switch, the second high side switch and a first low side switch.

In one embodiment, the power conversion circuit is further configured to operably switch an inductor, wherein the inductor is coupled between the first node and a switching node, wherein a portion of the plurality of the conversion switches are coupled to the switching node; wherein in a steady state, a voltage across the at least one conversion capacitor is 1/P-fold of the second voltage, wherein P is a real number greater than one; wherein the plurality of the conversion switches are configured to operably switch the at least one conversion capacitor and the inductor periodically, so as to perform power conversion between the first voltage and the second voltage in an at least three-level pulse width modulation (PWM) scheme.

In one embodiment, in the power conversion mode, the drain-gate clamp voltage is greater than a maximum of the respective drain-gate voltages of the respective corresponding switches of the group of switches during periodical switching for power conversion.

In one embodiment, the over voltage threshold is smaller than the bus maximum rating voltage.

The present invention proposes a high efficiency power conversion circuit capable of clamping respective drain-gate voltages of a portion of respective corresponding switches of the power conversion circuit at a preferred voltage level. Consequently, in this case, the present invention is capable of withstanding high voltage (i.e., having high voltage tolerance) and enhancing power conversion efficiency. Moreover, the present invention is capable of reducing charging temperature and reducing manufacturing cost.

BRIEF DESCRIPTION OF THE DRAWINGS

FIG. 1A shows a schematic diagram of a conventional power conversion circuit, whereas.

FIG. 3A shows a schematic diagram of a sub-clamp circuit of a power conversion circuit according to an embodiment of the present invention, whereas.

DESCRIPTION OF THE PREFERRED EMBODIMENTS

Figure 1A:
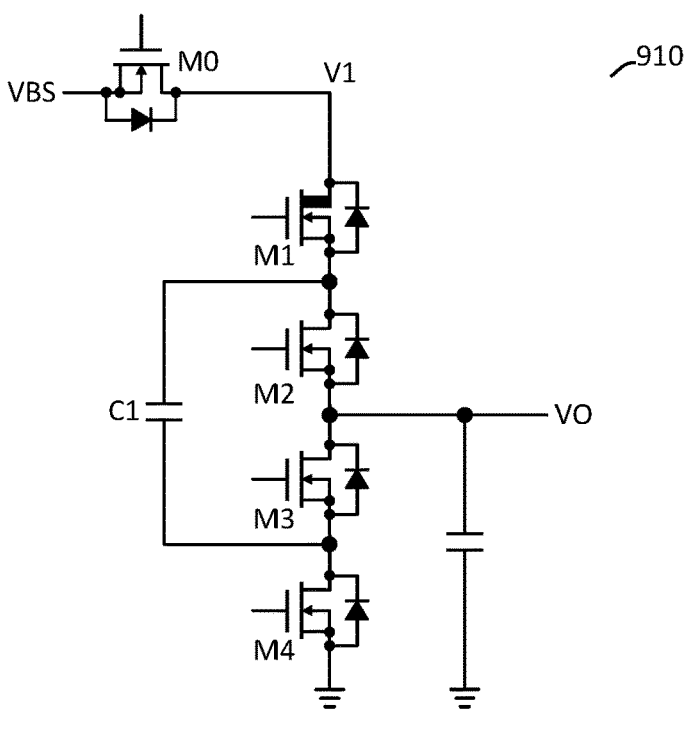
Figure 1B:
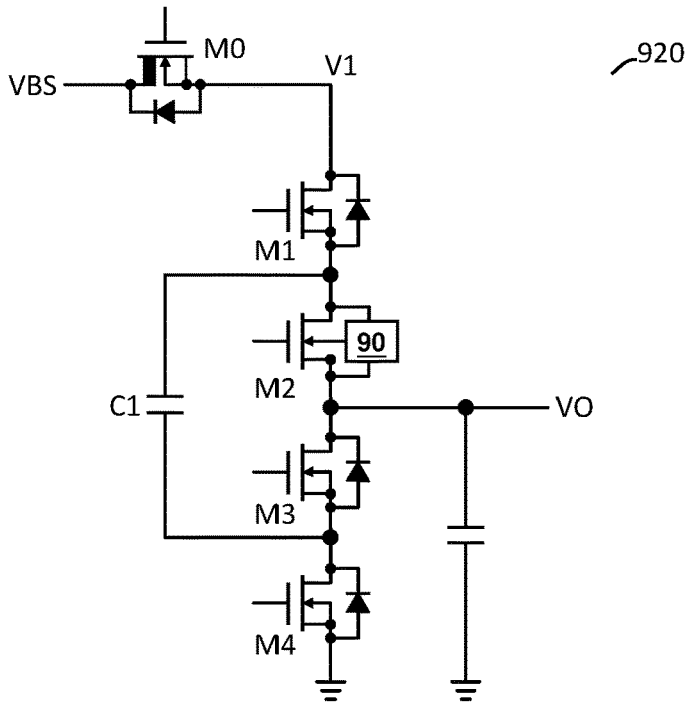
FIG. 1B shows a schematic diagram of another conventional power conversion circuit.
Figure 2:
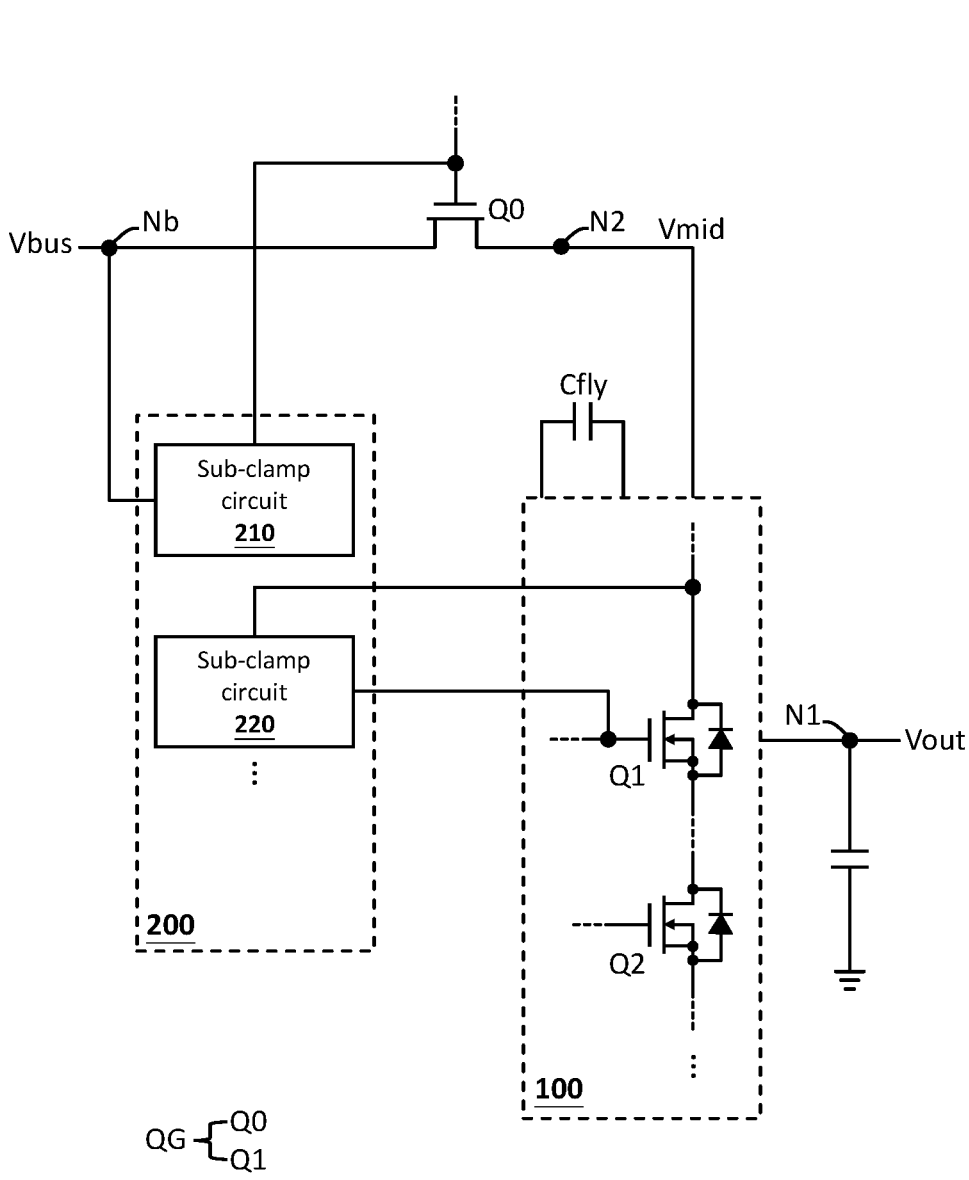
FIG. 2 shows a schematic block diagram of a power conversion circuit according to an embodiment of the present invention.

The drawings as referred to throughout the description of the present invention are for illustration only, to show the interrelations between the circuits and the signal waveforms, but not drawn according to actual scale of circuit sizes and signal amplitudes and frequencies. For better understanding the essence of the present invention, practical implementation details will be described in the embodiments below. It should be understood that such details are not for limiting the broadest scope of the present invention Please refer to FIG. 2, which shows a schematic block diagram of a power conversion circuit according to an embodiment of the present invention. As shown in FIG. 2, in one embodiment, the power conversion circuit 1000 is configured to operably perform power conversion between a bus voltage Vbus at a bus node Nb and a first voltage Vout at a first node N1. The power conversion circuit 1000 comprises: a bus switch Q0, plural conversion switches 100 and a clamp circuit 200. In one embodiment, the bus switch Q0 is coupled between the bus node Nb and a second node N2, wherein the second node N2 has a second voltage Vmid. In one embodiment, the plural conversion switches 100 include: a switch Q1 and a switch Q2. In this embodiment, each of the switch Q1 and the switch Q2 is an N-type metal oxide semiconductor (MOS) transistor. In one embodiment, the plural conversion switches 100 are coupled, with at least one conversion capacitor, to the first node N1 and the second node N2. In this embodiment, the at least one conversion capacitor includes a first conversion capacitor Cfly.

In one embodiment, in a power conversion mode, the bus switch Q0 is turned ON, so that the plural conversion switches 100 are configured to operably switch the at least one conversion capacitor (i.e., the first conversion capacitor Cfly) periodically, thereby performing power conversion between the second voltage Vmid and the first voltage Vout via a switched capacitor power conversion method. It is worthwhile mentioning that, the aforementioned term "power conversion", as may be used herein, is referred to as: a power conversion capable of performing a bilateral power conversion. In other words, the second voltage Vmid can be converted to the first voltage Vout, or alternately, the first voltage Vout can be converted to the second voltage Vmid.

Please still refer to FIG. 2. In one embodiment, the clamp circuit 200 includes plural sub-clamp circuits (e.g., a sub-clamp circuit 210, a sub-clamp circuit 220 and so on). In one embodiment, the respective plural sub-clamp circuits are configured to operably clamp respective drain-gate voltages of respective corresponding switches of a group of switches (abbreviated as QG), so that each drain-gate voltage of the respective corresponding switches of the group of switches QG does not exceed a drain-gate clamp voltage VGD-_clamp. In one embodiment, the group of switches QG include the bus switch Q0 and at least one switch of the plural conversion switches 100. With this clamping scheme, when the bus node Nb is applied with a bus maximum rating voltage, respective drain-source voltages of the bus switch Q0 and the respective switch in the respective corresponding plural conversion switches 100 are smaller than respective corresponding breakdown voltages. In one embodiment, the bus maximum rating voltage is higher than the respective breakdown voltages of the bus switch Q0 and the respective switches in the plural conversion switches 100.

In the embodiment shown in FIG. 2, the group of switches QG include: the bus switch Q0 and the switch Q1. The plural sub-clamp circuits include: a bus sub-clamp circuit 210 and a bus sub-clamp circuit 220. In one embodiment, the switches of the group of switches QG (i.e., the bus switch Q0 and the switch Q1) are sequentially coupled in series. In this embodiment, the bus sub-clamp circuit 210 is configured to operably clamp a drain-gate voltage of the bus switch Q0, whereas, the bus sub-clamp circuit 220 is configured to operably clamp a drain-gate voltage of the switch Q1, so that each of the drain-gate voltages of the bus switch Q0 and the switch Q1 does not exceed the drain-gate clamp voltage VGD_clamp. With this clamping scheme, when the bus node Nb is applied with the bus maximum rating voltage, the respective drain-source voltages of the bus switch Q0 and the switches Q1 and Q2 are smaller than their corresponding breakdown voltages. In one embodiment, a relationship between the drain-gate clamp voltage VGD_clamp and the drain-source voltage (corresponding to a drain-source clamp voltage VDS_clamp) of the bus switch Q0 or of the switch Q1, when being clamped, can be represented as the following Equation 1:

$$VDS\_clamp = VGD\_clamp + Vth \qquad \text{(Equation 1)}$$

In the Equation 1, Vth denotes an ON threshold voltage of the bus switch Q0 or the switch Q1. To elaborate in more detail, the Equation 1 demonstrates that: when a drain-gate voltage of the bus switch Q0 or the switch Q1 is clamped to become the drain-gate clamp voltage VGD_clamp by the clamp circuit 200, a drain-source voltage of the bus switch Q0 or the switch Q1 is clamped to become the drain-source clamp voltage VDS_clamp which is a sum of the drain-gate clamp voltage VGD_clamp and the ON threshold voltage Vth of the bus switch Q0 or the switch Q1, so that the drain-source voltage VDS of the bus switch Q0 or the switch Q1 is smaller than the corresponding breakdown voltage.

It is worthwhile mentioning that, in the power conversion mode, the aforementioned drain-gate clamp voltage VGD-_clamp is greater than a maximum of the respective drain-gate voltages of the respective corresponding switches of the group of switches QG during periodical switching for power conversion. In other words, when the bus node Nb is not applied with the bus maximum rating voltage, each drain-gate voltage of the group of switches QG does not exceed the drain-gate clamp voltage VGD_clamp. As a result, in this case, the clamp circuit 200 is not activated, such that the respective switch of the group of switches QG can periodically switch for power conversion normally.

Figure 3A:
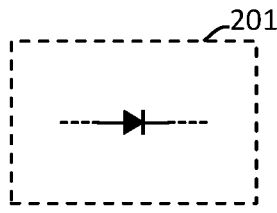
Figure 3B:
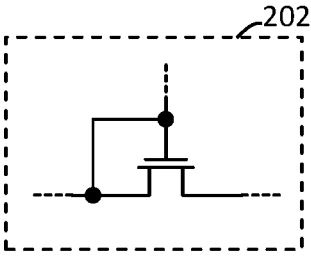
FIG. 3B shows a schematic diagram of a sub-clamp circuit of a power conversion circuit according to another embodiment of the present invention.

Please refer to FIG. 3A along with FIG. 3B. FIG. 3A shows a schematic diagram of a sub-clamp circuit of a power conversion circuit according to an embodiment of the present invention, whereas, FIG. 3B shows a schematic diagram of a sub-clamp circuit of a power conversion circuit according to another embodiment of the present invention. In one embodiment, the sub-clamp circuit of the present invention includes: at least one diode (as shown by the sub-clamp circuit 201 in FIG. 3A) or at least one diode-connected transistor having its gate and drain being electrically connected to each other (as shown by the sub-clamp circuit 202 in FIG. 3B). In other words, the sub-clamp circuits (e.g. 210 or 220) shown in FIG. 2 can be specifically implemented as the sub-clamp circuit 201 shown in FIG. 3A or the sub-clamp circuit 202 shown in FIG. 3B. In one embodiment, the aforementioned drain-gate clamp voltage VGD_clamp is correlated with a forward voltage of the aforementioned diode, a reverse breakdown voltage of the aforementioned diode or an ON threshold voltage of the aforementioned diode-connected transistor.

Figure 3C:
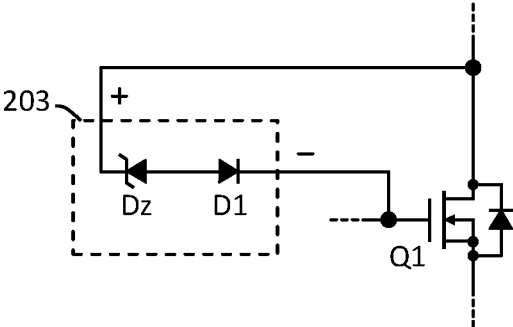
FIG. 3C shows a schematic diagram of a sub-clamp circuit of a power conversion circuit according to a specific embodiment of the present invention.

Please refer to FIG. 3C, which shows a schematic diagram of a sub-clamp circuit of a power conversion circuit according to a specific embodiment of the present invention. In one embodiment, the aforementioned at least one diode included by the aforementioned sub-clamp circuit can be a metal junction diode, a P-N junction diode, a Zener diode or plural diodes connected in series. When the aforementioned at least one diode is a Zener diode, a reverse breakdown voltage of such Zener diode determines the aforementioned drain-gate clamp voltage VGD_clamp. In one specific embodiment, as shown in FIG. 3C, the at least one diode of the sub-clamp circuit 203 includes: a Zener diode Dz and a reverse blocking diode D1. In this embodiment, the Zener diode Dz has a reverse terminal coupled to a positive clamp terminal, whereas, the reverse blocking diode D1 has a forward terminal coupled to a forward terminal of the Zener diode Dz and has a reverse terminal coupled to a negative clamp terminal. In one embodiment, the positive clamp terminal and the negative clamp terminal are coupled to a drain and a gate of the respective switch (e.g., as shown by the switch Q1 in FIG. 2) of the group of switches QG, respectively, so as to clamp the respective drain-gate voltages of the respective corresponding switches (e.g., as shown by the switch Q1 in FIG. 2) of the group of switches QG.

It is worthwhile noting that, in the embodiment shown in FIG. 3C, the reverse blocking diode D1 is configured to operably cut off a current which occurs in a case where a voltage at the negative clamp terminal is higher than a voltage at the positive clamp terminal. In this embodiment, the drain-gate clamp voltage VGD_clamp is correlated with a sum of a forward voltage Vfd of the reverse blocking diode D1 and a reverse breakdown voltage Vzd of the Zener diode Dz. In other words, in this case, a drain-source voltage of the switch Q1 shown in FIG. 3C is clamped at the drain-source clamp voltage VDS_clamp which can be represented as following Equation 2:

$$VGD\_clamp=Vzd+Vfd \qquad \text{(Equation 2)}$$

Figure 4:
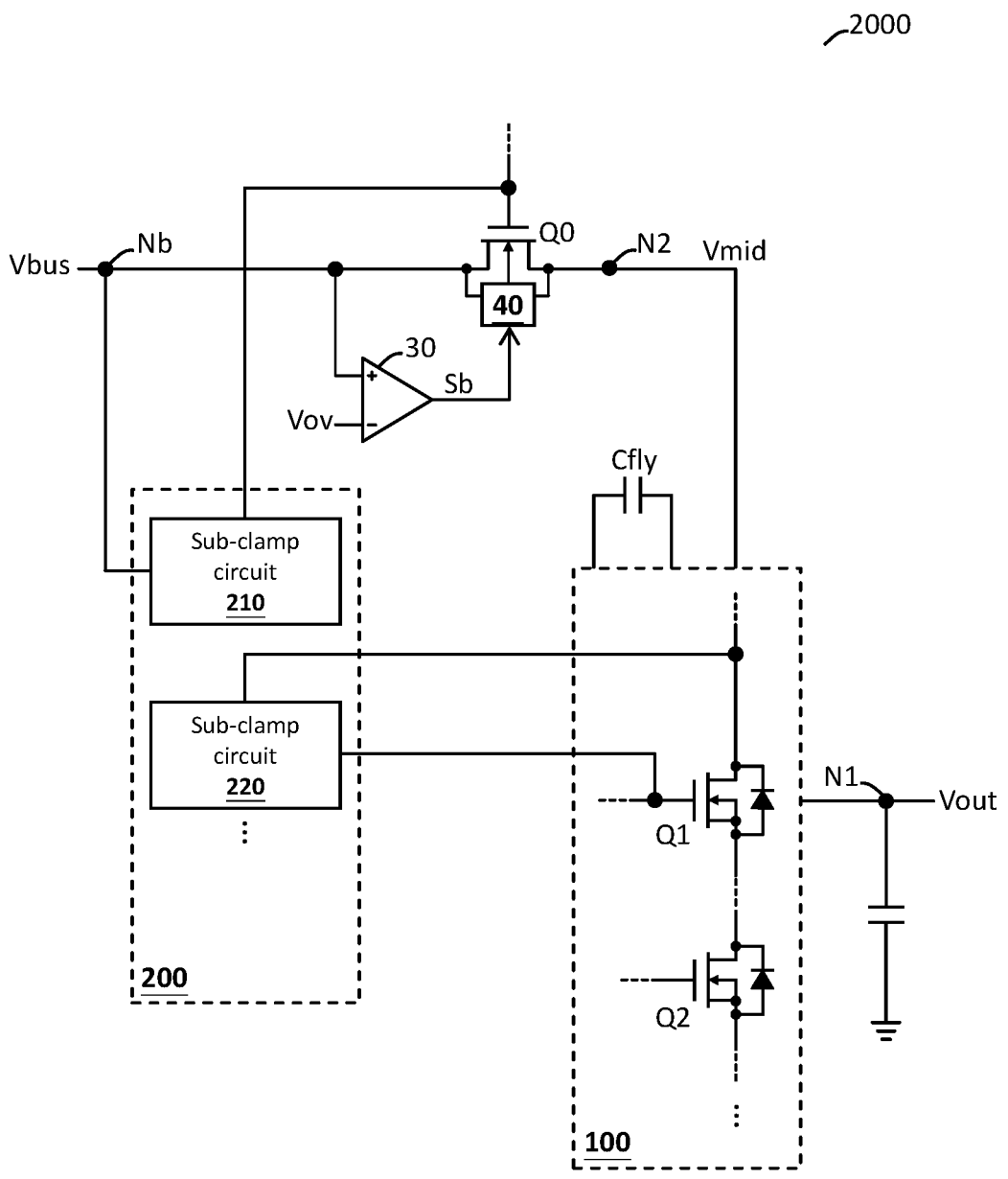
FIG. 4 shows a schematic block diagram of a power conversion circuit according to an embodiment of the present invention.

Please refer to FIG. 4, which shows a schematic block diagram of a power conversion circuit according to an embodiment of the present invention. The power conversion circuit 2000 of this embodiment shown in FIG. 4 is similar to the power conversion circuit 1000 of the embodiment shown in FIG. 2, but is different in that: as compared to the power conversion circuit 1000 of the embodiment shown in FIG. 2, the power conversion circuit 2000 of this embodiment shown in FIG. 4 further comprises: a comparator 30 and a bias voltage switching circuit 40. In one embodiment, the comparator 30 is configured to operably compare the bus voltage Vbus with an over voltage threshold Vov to generate a bias voltage switching signal Sb. In one embodiment, the bias voltage switching circuit 40 is configured to operably switch a body bias voltage of the bus switch Q0 according to the bias voltage switching signal Sb. In one embodiment, when the bus voltage Vbus is higher than the over voltage threshold Vov, the bias voltage switching circuit 40 is configured to operably switch the body bias voltage to the bus voltage Vbus or else switch the body bias voltage to a second voltage Vmid. It is worthwhile mentioning that, when the bus voltage Vbus is abnormally increased to an extent where the bus voltage Vbus exceeds the over voltage threshold Vov, through switching the body bias voltage of the bus switch Q0 by the bias voltage switching circuit 40, possible current flowing from a bus node Nb (which has a high voltage) to a second node N2 is prevented, so that a second voltage Vmid can be prevented from being elevated by the possible current.

It is worthwhile mentioning that, because the over voltage threshold Vov is smaller than a bus maximum rating voltage, in a scenario where the bus voltage Vbus has been elevated but has not yet reached the bus maximum rating voltage, the bias voltage switching circuit 40 is configured to switch the body bias voltage of the bus switch Q0, thereby preventing a current flowing from the bus node Nb (which has the high voltage) to the second node N2.

Figure 5:
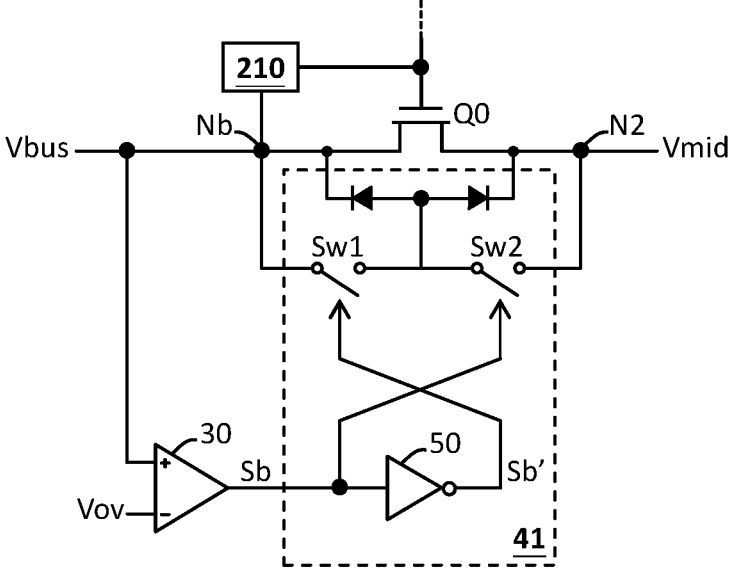
FIG. 5 shows a schematic diagram of a bias voltage switching circuit of a power conversion circuit according to a specific embodiment of the present invention.

Please refer to FIG. 5, which shows a schematic diagram of a bias voltage switching circuit of a power conversion circuit according to a specific embodiment of the present invention. In one embodiment, the bias voltage switching circuit 41 shown in FIG. 5 includes: a switch Sw1, a switch Sw2 and an inverter 50. In one embodiment, when a bus voltage Vbus is not higher than an over voltage threshold Vov, the switch Sw1 is controlled to be ON according to an inverting signal Sb' of a bias voltage switching signal Sb, whereas, the switch Sw2 is controlled to be OFF according to the bias voltage switching signal Sb, such that a body bias voltage of a bus switch Q0 is conductive in a forward direction from a bus node Nb to a second node N2. In one embodiment, when the bus voltage Vbus is higher than the over voltage threshold Vov, the switch Sw2 is controlled to be ON according to the bias voltage switching signal Sb, whereas, the switch Sw1 is controlled to be OFF according to the inverting signal Sb' of the bias voltage switching signal Sb, such that the body bias voltage of the bus switch Q0 is conductive in a forward direction from the second node N2 to the bus node Nb, thereby blocking a possible current flowing from the bus node Nb to the second node N2.

Figure 6:
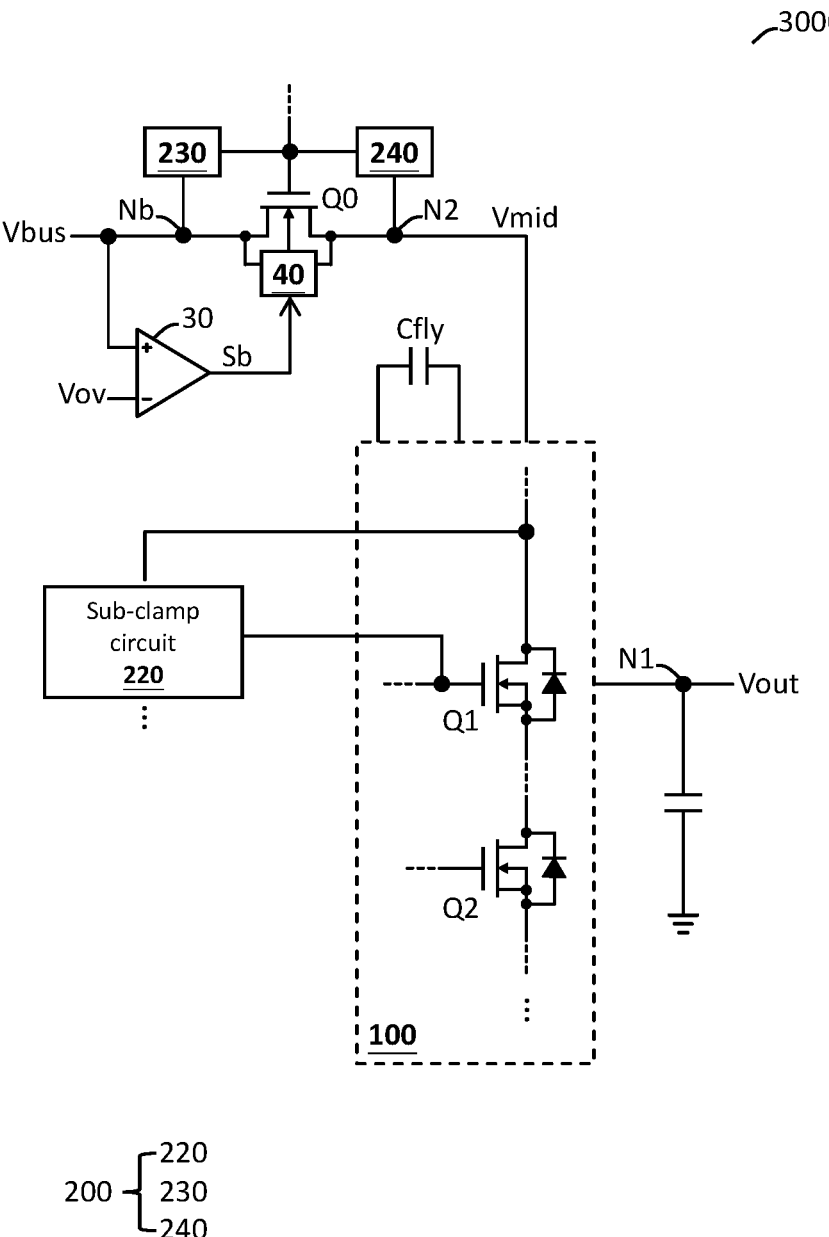
FIG. 6 shows a schematic diagram of a power conversion circuit according to an embodiment of the present invention.

Please refer to FIG. 6, which shows a schematic diagram of a power conversion circuit according to an embodiment of the present invention. The power conversion circuit 3000 of this embodiment shown in FIG. 6 is similar to the power conversion circuit 2000 of the embodiment shown in FIG. 4, but is different in that: as compared to the power conversion circuit 2000 of the embodiment shown in FIG. 4, in the power conversion circuit 3000 of this embodiment shown in FIG. 6, the plural sub-clamp circuits include: a first bus sub-clamp circuit 230 and a second bus sub-clamp circuit 240. In this embodiment, the first bus sub-clamp circuit 230 is coupled between the bus node Nb and a gate of the bus switch Q0, whereas, the second bus sub-clamp circuit 240 is coupled between the gate of the bus switch Q0 and the second node N2. In this embodiment, the first bus sub-clamp circuit 230 is configured to operably clamp a voltage between the bus node Nb and the gate of the bus switch Q0, so as to clamp a voltage difference between the bus node Nb and the second node N2, so that the voltage difference between the bus node Nb and the second node N2 is smaller than a breakdown voltage of the bus switch Q0. In this embodiment, the second bus sub-clamp circuit 240 is configured to operably clamp a voltage between the second node N2 and the gate of the bus switch Q0, so as to clamp the voltage difference between the second node N2 and the bus node Nb, so that the voltage difference between the second node N2 and the bus node Nb is smaller than the breakdown voltage of the bus switch Q0.

In the embodiment shown in FIG. 6, note that the second bus sub-clamp circuit 240 is configured to operate in a case where a second voltage Vmid is higher than a bus voltage Vbus. In other words, when the second voltage Vmid is higher than the bus voltage Vbus, the second bus sub-clamp circuit 240 will be activated. As a result, in this case, the second bus sub-clamp circuit 240 is configured to clamp a drain-source voltage of the bus switch Q0, so that the drain-source voltage of the bus switch Q0 does not exceed a breakdown voltage of the bus switch Q0.

Figure 7:
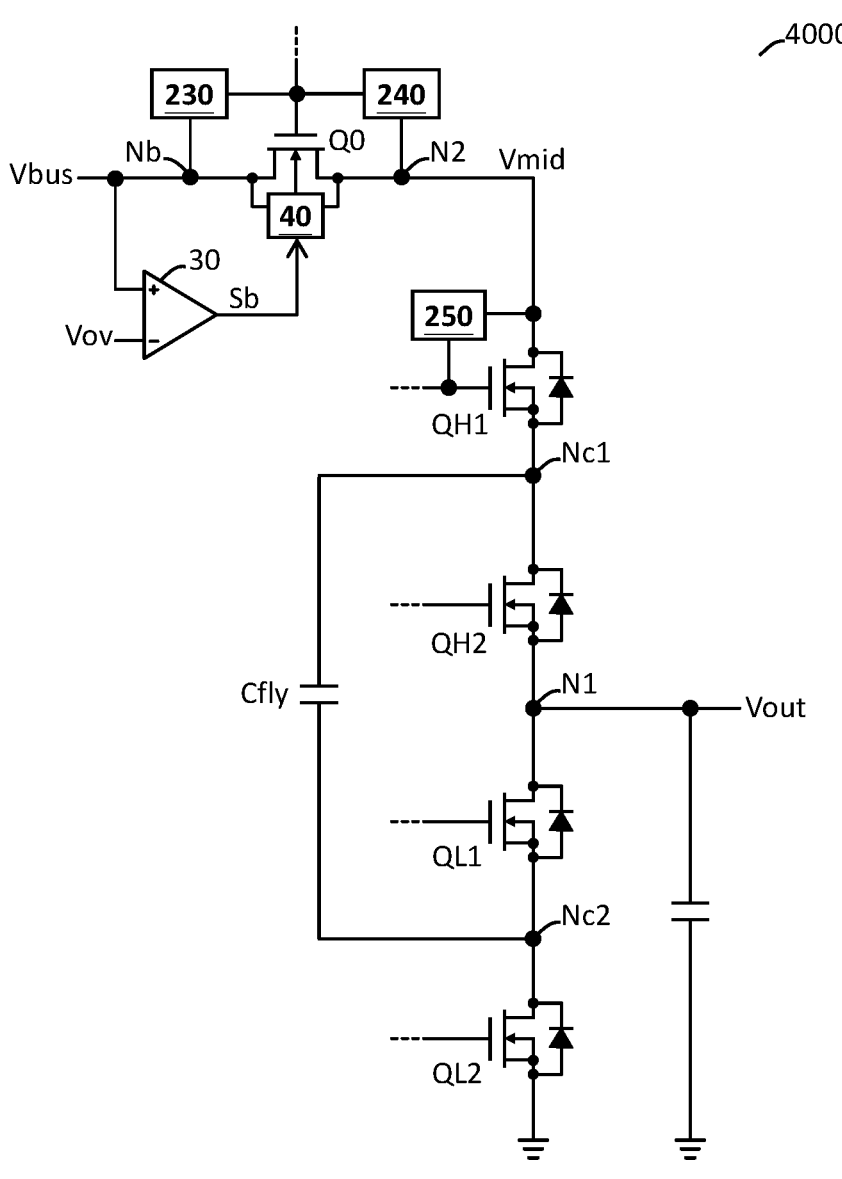
FIG. 7 shows a schematic diagram of a power conversion circuit according to a specific embodiment of the present invention.

Please refer to FIG. 7, which shows a schematic diagram of a power conversion circuit according to a specific embodiment of the present invention. The power conversion circuit 4000 of this embodiment shown in FIG. 7 is similar to the power conversion circuit 3000 of the embodiment shown in FIG. 6, but is different in that: as compared to the power conversion circuit 3000 of the embodiment shown in FIG. 6, in the power conversion circuit 4000 of this embodiment shown in FIG. 7, plural conversion switches 100 include: a first high side switch QH1, a second high side switch QH2, a first low side switch QL1 and a second low side switch QL2, four of which are connected in series between a second node N2 and a ground node. In this embodiment, each switch of the plural conversion switches 100 is an NMOS transistor. A first conversion capacitor Cfly is coupled between a source of the first high side switch QH1 and a source of the first low side switch QL1. A first node N1 is coupled to a source of the second high side switch QH2. In one embodiment, in a power conversion mode, the plural conversion switches 100 are configured to operably control a first end Nc1 of the first conversion capacitor Cfly to periodically switch between the first node N1 and a second node N2, and control a second end Nc2 of the first conversion capacitor Cfly to periodically switch between the first node N1 and the ground node, such that in a steady state, a voltage across the first conversion capacitor Cfly is ½ of a second voltage Vmid and a first voltage Vout is ½ of the second voltage Vmid.

In one embodiment, all the breakdown voltages of the bus switch Q0 and the plural conversion switches 100 are the same. In one embodiment, a group of switches QG includes k switches, wherein k is a quotient of the bus maximum rating voltage divided by a drain-source clamp voltage VDS_clamp and k is a positive integer. It is worthwhile mentioning that, the aforesaid drain-source clamp voltage VDS_clamp is defined as: the respective drain-source voltages of the respective corresponding switches of the group of switches 100 in a situation where the respective drain-gate voltages of the respective corresponding switches of the group of switches 100 are clamped at the respective corresponding drain-gate clamp voltage VGD_clamp.

In one specific embodiment, as shown in FIG. 7, an over voltage threshold Vov is for example 18V, a bus maximum rating voltage is for example 20V and each of the breakdown voltages of the bus switch Q0 and the conversion switches 100 is for example 6V. In this embodiment, k is equal to two. In other words, in this case, a group of switches QG include two switches. Besides, as described in the embodiment of FIG. 2, the group of switches QG include the bus switch Q0 and at least one of the plural conversion switches 100. More specifically in this embodiment, the at least one of the plural conversion switches 100 in the group of switches QG includes: the first high side switch QH1. In this embodiment, the clamp circuit 200 includes: a first bus sub-clamp circuit 230, a second bus sub-clamp circuit 240 and a sub-clamp circuit 250. To elaborate in more detail, in this embodiment, when the bus voltage Vbus is higher than the over voltage threshold Vov (e.g., 18V), a body bias voltage of the bus switch Q0 is conductive in a forward direction from the second node N2 to the bus node Nb. When the bus voltage Vbus is elevated to reach the bus maximum rating voltage (e.g., 20V), the first bus sub-clamp circuit 230 will be firstly activated and the sub-clamp circuit 250 will be subsequently activated. When the bus voltage Vbus has already been elevated to reach the bus maximum rating voltage (e.g., 20V), the first bus sub-clamp circuit 230 clamps a drain-source voltage of the bus switch Q0 at a sum of the drain-gate clamp voltage VGD_clamp (e.g., 6V) and an ON threshold voltage Vth of the bus switch Q0 (e.g., 7V), so that the drain-source voltage of the bus switch Q0 does not exceed a breakdown voltage of the bus switch Q0 (e.g. 8V). Consequently, under such circumstance, the second voltage Vmid is equal to 13V. Besides, under such circumstance, the sub-clamp circuit 250 clamps the drain-source voltage of the first high side switch QH1 at 7V, so that the drain-source voltage of the first high side switch QH1 does not exceed a breakdown voltage (e.g., 8V) of the first high side switch QH1. Note that, in this case, a source voltage of the first high side switch QH1 is equal to 6V.

It is worthwhile mentioning that, the above-mentioned specific embodiment shown in FIG. 7 illustrates that: through the clamp circuit 200 of the present invention, respective drain-source voltages of the bus switch Q0 and each of the plural conversion switches 100 are smaller than a corresponding breakdown voltage. As a consequence, in this case, the bus switch Q0 and each of the plural conversion switches 100 can be implemented by a low voltage device which has a relatively lower ON resistance. Consequently and desirably, as compared to the prior arts, the present invention can remarkably reduce ON power loss in a scenario where the power conversion circuit is applied for example for charging, thus enhancing power conversion efficiency and/or reducing manufacturing cost.

Besides, it is worthwhile mentioning that, in one embodiment (e.g., in the specific embodiment shown in FIG. 7), because each of the breakdown voltages of the bus switch Q0 and the plural conversion switches 100 is smaller than ½ of the bus maximum rating voltage, the present invention can dramatically reduce manufacturing cost.

Figure 8:
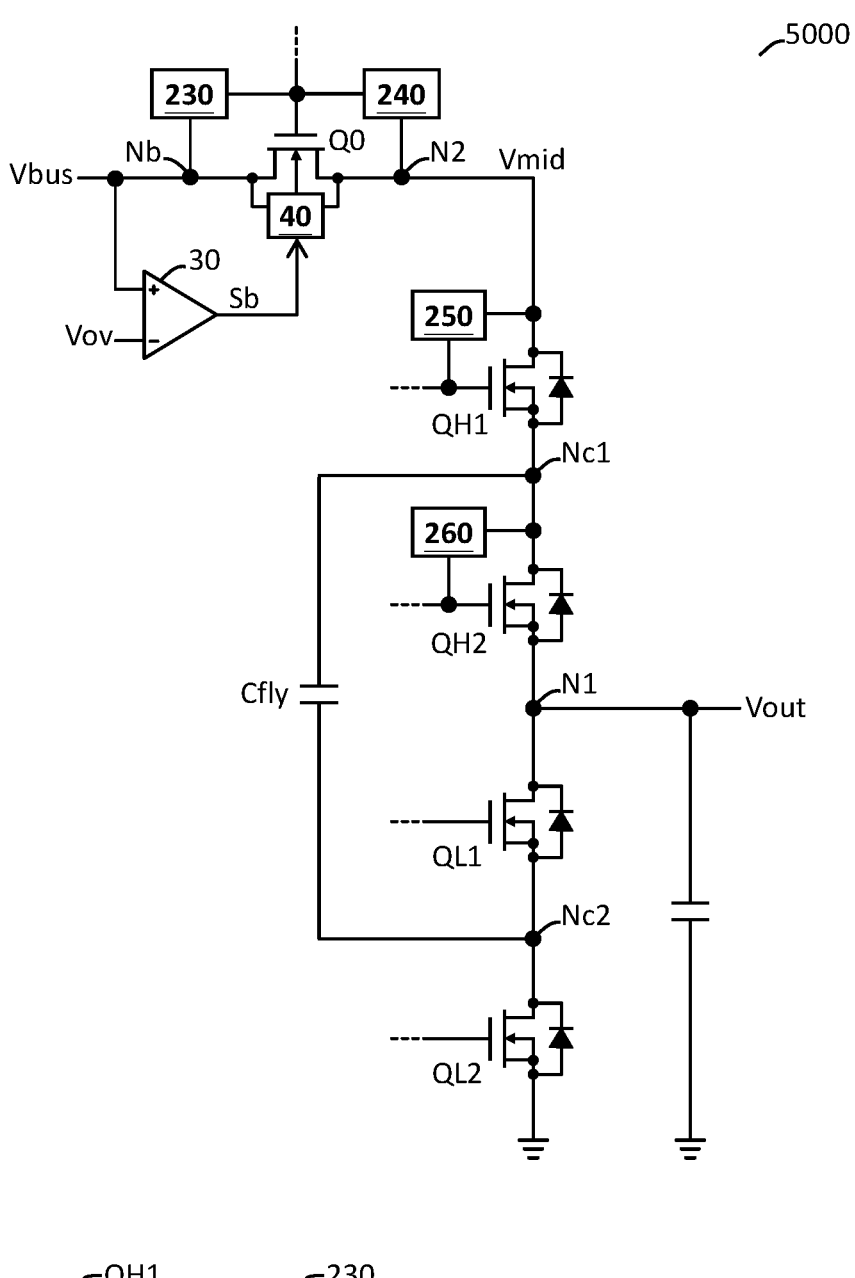
FIG. 8 and FIG. 9 respectively show two schematic block diagrams of a power conversion circuit according to two specific embodiments of the present invention.
Figure 9:
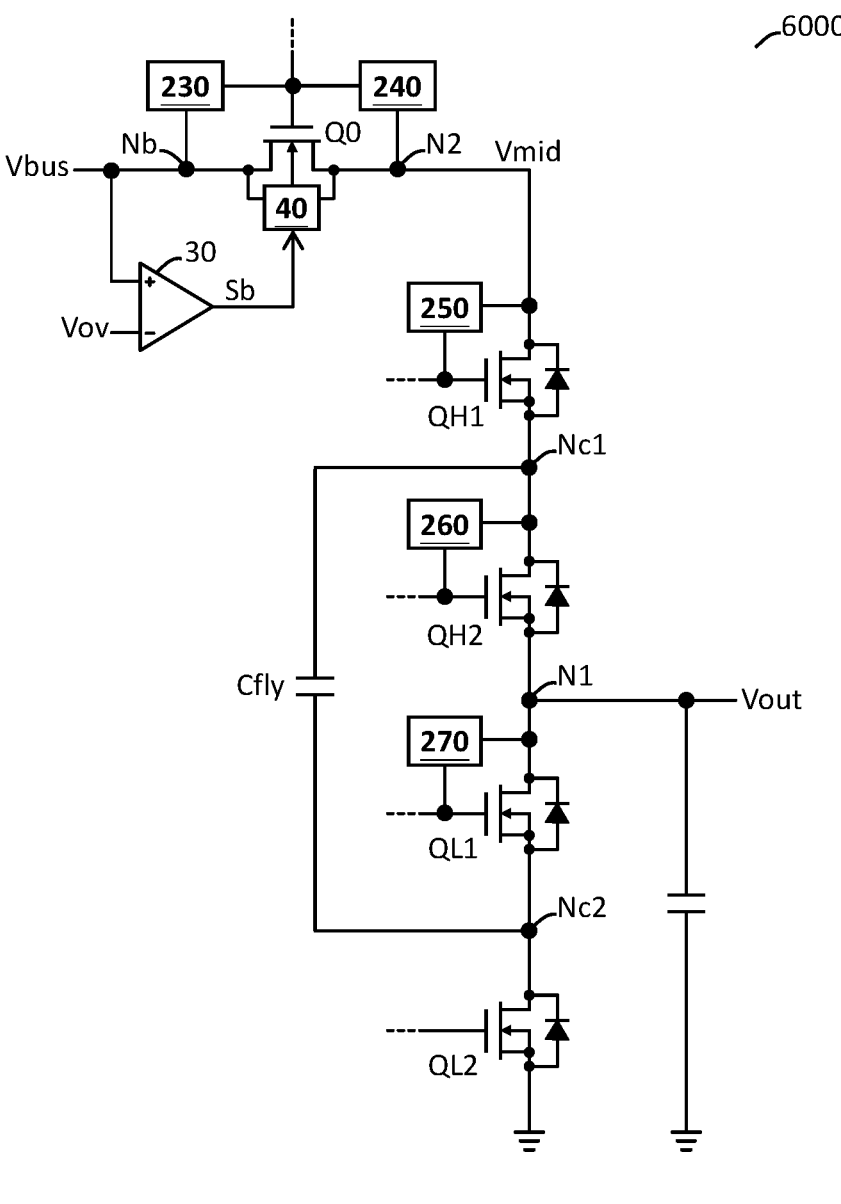

Please refer to FIG. 8 along with FIG. 9. FIG. 8 and FIG. 9 respectively show two schematic block diagrams of a power conversion circuit according to two specific embodiments of the present invention. The power conversion circuit 5000 of this embodiment shown in FIG. 8 and the power conversion circuit 6000 of this embodiment shown in FIG. 9 are similar to the power conversion circuit 4000 of the embodiment shown in FIG. 7, but differ in that, in one embodiment, as shown in FIG. 8, the plural conversion switches 100 in the group of switches QG include: a first high side switch QH1 and a second high side switch QH2. Besides, as compared to the power conversion circuit 4000 of the embodiment shown in FIG. 7, a clamp circuit 200 in FIG. 8 further includes: a sub-clamp circuit 260. In one embodiment, as shown in FIG. 9, the plural conversion switches 100 in a group of switches QG include: a first high side switch QH1, a second high side switch QH2 and a first low side switch QL1. Besides, as compared to the power conversion circuit 4000 of the embodiment shown in FIG. 7, a clamp circuit 200 in FIG. 9 further includes: a sub-clamp circuit 260 and a sub-clamp circuit 270. In regard to operation details and features of the embodiment shown in FIG. 8 and the embodiment shown in FIG. 9, those skilled in this art can readily conceive details based upon operations and features elaborated in the embodiment shown in FIG. 7, so the details thereof are not redundantly repeated here.

Figure 10:
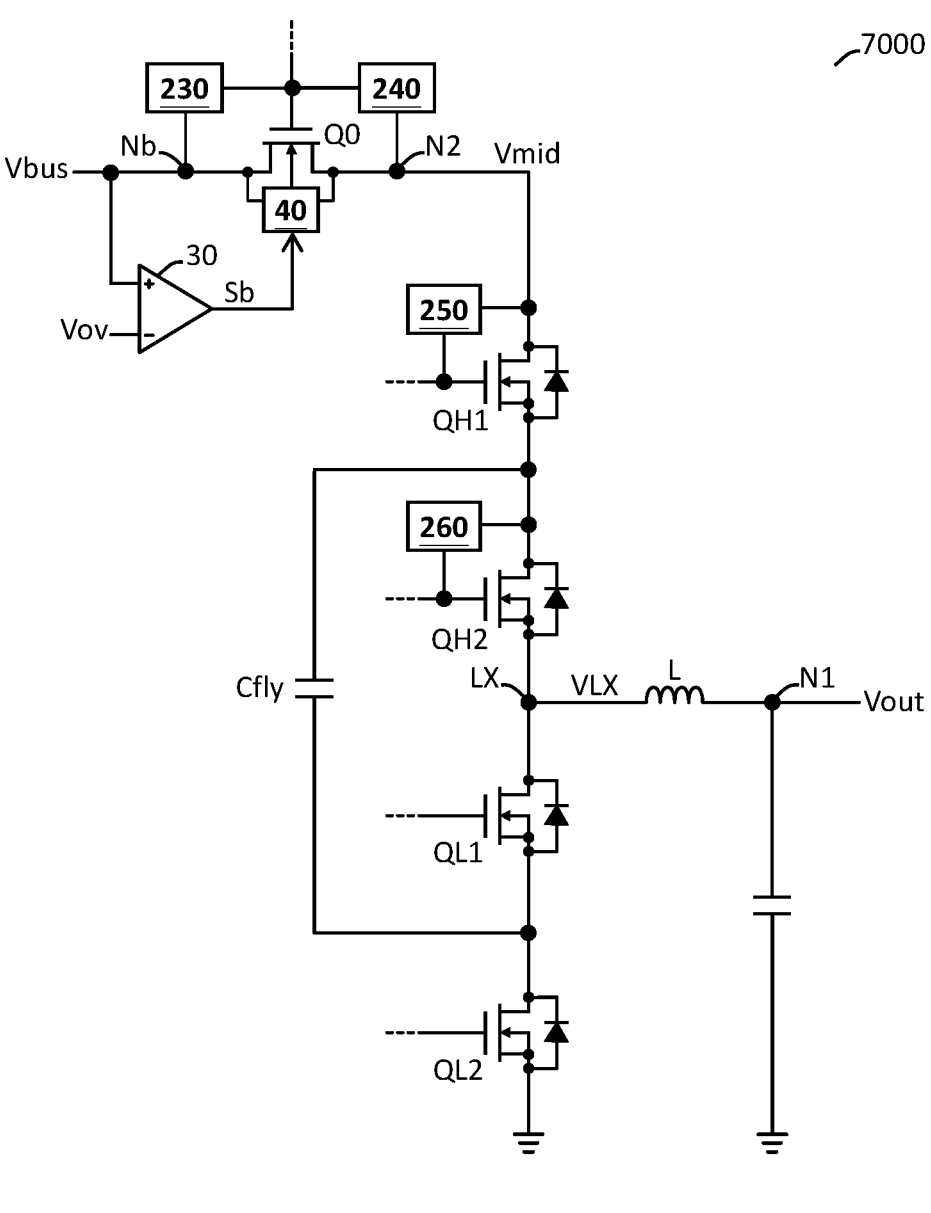
FIG. 10 shows a schematic diagram of a power conversion circuit according to a specific embodiment of the present invention.

Please refer to FIG. 10, which shows a schematic diagram of a power conversion circuit according to a specific embodiment of the present invention. The power conversion circuit 7000 of this embodiment shown in FIG. 10 is similar to the power conversion circuit 5000 of the embodiment shown in FIG. 8, but is different in that: as compared to the power conversion circuit 5000 of the embodiment shown in FIG. 8, in one embodiment, as shown in FIG. 10, the power conversion circuit 7000 of this embodiment shown in FIG. 10 is further configured to operably switch an inductor L. In one embodiment, the inductor L is coupled between a first node N1 and a switching node LX. A portion of the plural conversion switches 100 are coupled to the switching node LX. In this embodiment, the aforementioned portion of the plural conversion switches 100 includes a second high side switch QH2 and a first low side switch QL1. In one embodiment, in a steady state, a voltage across a first conversion capacitor Cfly is 1/P-fold of a second voltage Vmid, wherein P is a real number greater than one. In this embodiment, P is equal to 2. In one embodiment, the plural conversion switches 100 are configured to operably switch the first conversion capacitor Cfly and the inductor L periodically, so as to perform power conversion between a first voltage Vout and the second voltage Vmid in an at least three-level pulse width modulation (PWM) scheme. To elaborate in more detail, as shown in FIG. 10, the switching node LX has a switching voltage VLX, wherein the switching voltage VLX is periodically switched among the second voltage Vmid, a ground potential and an intermediate voltage, so as to accomplish power conversion in three-level PWM scheme. In one embodiment, the intermediate voltage is related to the voltage across the first conversion capacitor Cfly (e.g., the intermediate voltage is related to ½ of the second voltage Vmid), whereas, the first voltage Vout is correlated with a duty ratio of the switching of the plural conversion switches 100.

Figure 11:
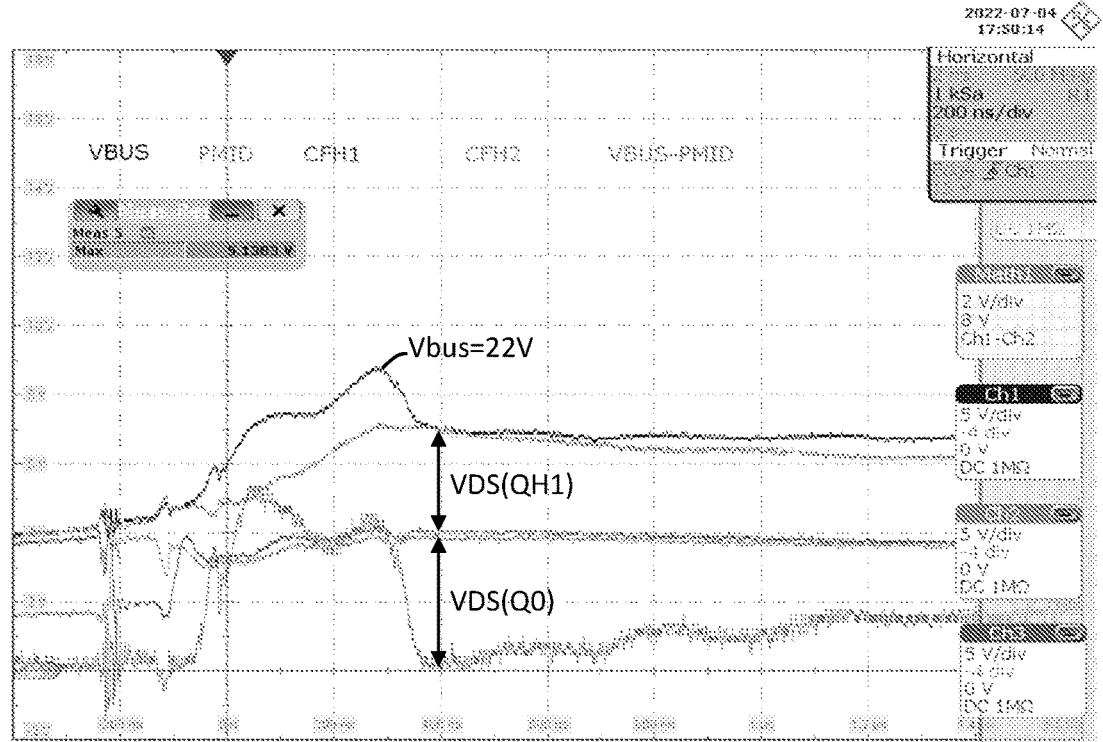
FIG. 11 illustrates signal waveform diagrams depicting signals associated with the operation of a power conversion circuit according to an embodiment of the present invention.

Please refer to FIG. 11, which illustrates signal waveform diagrams depicting signals associated with the operation of a power conversion circuit according to an embodiment of the present invention. In one embodiment, as shown in FIG. 11, when a bus voltage Vbus reaches a bus maximum rating voltage (e.g., 22V) due to occurrence of for example an unwanted lightning strike surge, through adopting a clamp circuit and a bias voltage switching circuit of the present invention, the present invention can appropriately distribute voltages to respective drain-gate voltages of respective corresponding switches of a group of switches QG. For example, as shown in FIG. 11, a drain-gate voltage of a bus switch Q0 and a drain-gate voltage of a first high side switch QH1 are both clamped at a corresponding and appropriate voltage, so that the respective drain-source voltages of the bus switch Q0 and the respective switch in the respective corresponding plural conversion switches 100 are smaller than a corresponding breakdown voltage, thereby protecting the bus switch Q0 and all the switches of the plural conversion switches 100 from being damaged.

Figure 12:
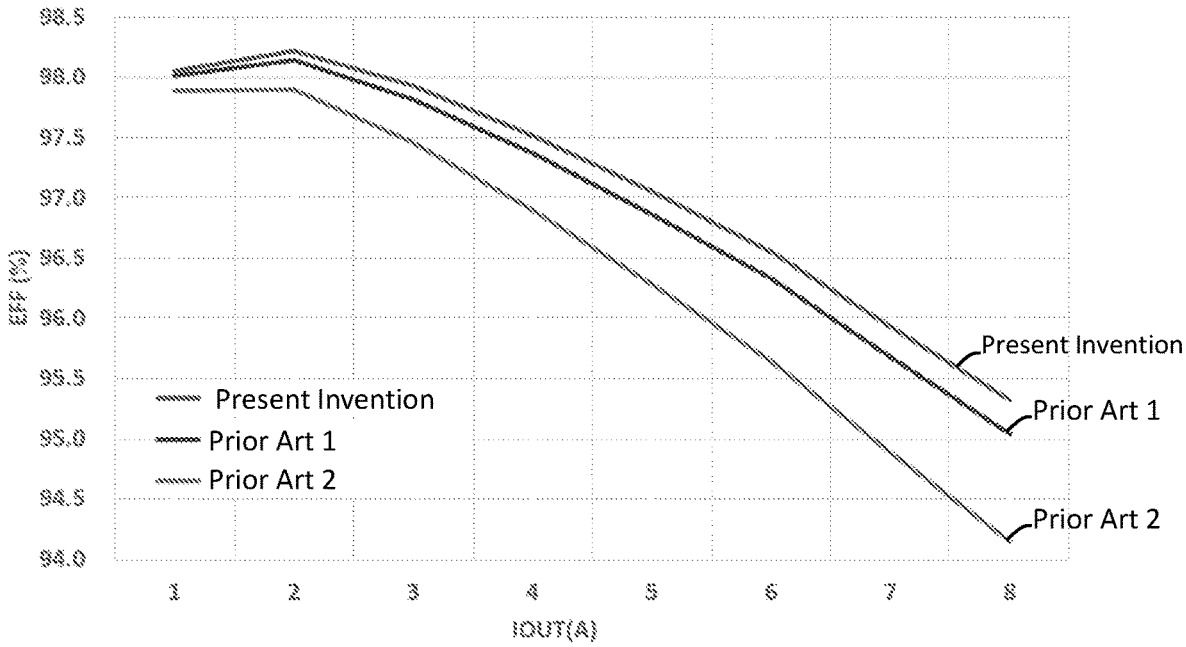
FIG. 12 illustrates an efficiency diagram depicting the operation of a power conversion circuit according to an embodiment of the present invention.

Please refer to FIG. 12, which illustrates an efficiency diagram depicting the operation of a power conversion circuit according to an embodiment of the present invention. The present invention can achieve an objective of withstanding high voltage for the entire circuitry through adopting a clamp circuit and a bias voltage switching circuit. As a consequence, in this case, as compared to a situation where it is required for the prior art power conversion circuits to implement a portion of switches by adopting a high voltage device, the present invention can implement all switches by low voltage devices. As shown in FIG. 12, as compared to the prior art, through adopting low voltage devices, the power conversion efficiency of the present invention is higher than the power conversion efficiency of the prior art. Consequently and desirably, advantages of the present invention include: providing a power conversion circuit having high voltage tolerance, increasing power conversion efficiency, and reducing charging temperature and manufacturing cost.

The present invention has been described in considerable detail with reference to certain preferred embodiments thereof. It should be understood that the description is for illustrative purpose, not for limiting the broadest scope of the present invention. An embodiment or a claim of the present invention does not need to achieve all the objectives or advantages of the present invention. The title and abstract are provided for assisting searches but not for limiting the scope of the present invention. Those skilled in this art can readily conceive variations and modifications within the spirit of the present invention. For example, to perform an action "according to" a certain signal as described in the context of the present invention is not limited to performing an action strictly according to the signal itself, but can be performing an action according to a converted form or a scaled-up or down form of the signal, i.e., the signal can be processed by a voltage-to-current conversion, a current-to-voltage conversion, and/or a ratio conversion, etc. before an action is performed. It is not limited for each of the embodiments described hereinbefore to be used alone; under the spirit of the present invention, two or more of the embodiments described hereinbefore can be used in combination. For example, two or more of the embodiments can be used together, or, a part of one embodiment can be used to replace a corresponding part of another embodiment. In view of the foregoing, the spirit of the present invention should cover all such and other modifications and variations, which should be interpreted to fall within the scope of the following claims and their equivalents.

What is claimed is:

1. A power conversion circuit, which is configured to operably perform power conversion between a bus voltage at a bus node and a first voltage at a first node; the power conversion circuit comprising:

a bus switch, which is coupled between the bus node and a second node, wherein the second node has a second voltage;

a plurality of conversion switches coupled, with at least one conversion capacitor, to the first node and the second node, wherein in a power conversion mode, the bus switch is turned ON, and the plurality of the conversion switches are configured to operably switch the at least one conversion capacitor periodically, thereby power conversion between the second voltage and the first voltage via a switched capacitor power conversion method is performed; and a clamp circuit which includes a plurality of sub-clamp circuits, wherein each of the plurality of sub-clamp circuits is configured to operably clamp respective drain-gate voltages of respective corresponding switches of a group of switches, so that the respective drain-gate voltages of the respective corresponding switches of the group of switches do not exceed a respective drain-gate clamp voltage, wherein the group of switches include the bus switch and at least one of the plurality of the conversion switches, so that when the bus node is applied with a bus maximum rating voltage, respective drain-source voltages of the bus switch and respective corresponding plurality of conversion switches are smaller than respective breakdown voltages;

wherein the bus maximum rating voltage is higher than the respective breakdown voltages of the bus switch and the respective corresponding plurality of conversion switches.

2. The power conversion circuit as claimed in claim 1, wherein the group of switches are sequentially coupled in series.

3. The power conversion circuit as claimed in claim 1, wherein the respective breakdown voltages of the bus switch and the respective corresponding plurality of conversion switches are of a same level, wherein the group of switches include k switches, wherein k is a quotient of the bus maximum rating voltage divided by a drain-source clamp voltage and k is a positive integer, wherein the drain-source clamp voltage is defined as: respective drain-source voltages of respective corresponding switches of the group of switches in a situation where the respective drain-gate voltages of the respective corresponding switches of the group of switches are clamped at the respective drain-gate clamp voltage.

4. The power conversion circuit as claimed in claim 1, wherein the respective breakdown voltage is smaller than ½ of the bus maximum rating voltage.

5. The power conversion circuit as claimed in claim 1, wherein when one switch of the group of switches is clamped at the respective drain-gate clamp voltage by the clamp circuit, a drain-gate voltage of the one switch of the group of switches is clamped at a sum of the respective drain-gate clamp voltage and an ON threshold voltage of the one switch of the group of switches, such that the drain-gate voltage of the one switch of the group of switches is smaller than the respective breakdown voltage.

6. The power conversion circuit as claimed in claim 1, wherein at least one of the plurality of the sub-clamp circuits includes: at least one diode or at least one diode-connected transistor having its gate and drain being electrically connected to each other, wherein the respective drain-gate clamp voltage is correlated with a forward voltage of the at least one diode, a reverse breakdown voltage of the at least one diode or an ON threshold voltage of the at least one diode-connected transistor.

7. The power conversion circuit as claimed in claim 6, wherein, when the at least one of the plurality of the sub-clamp circuits includes the at least one diode, the at least one diode includes:

a Zener diode having a reverse terminal coupled to a positive clamp terminal; and a reverse blocking diode having a forward terminal coupled to a forward terminal of the Zener diode and having a reverse terminal coupled to a negative clamp terminal;

wherein the positive clamp terminal and the negative clamp terminal are coupled to a drain and a gate, respectively, of one switch of the group of switches, so as to clamp a drain-gate voltage of the one switch of the group of switches;

wherein the reverse blocking diode is configured to operably cut off a current which occurs in a case where a voltage at the negative clamp terminal is higher than a voltage at the positive clamp terminal;

wherein the respective drain-gate clamp voltage is correlated with a sum of a forward voltage of the reverse blocking diode and a reverse breakdown voltage of the Zener diode.

8. The power conversion circuit as claimed in claim 1, further comprising:

a comparator, which is configured to operably compare the bus voltage with an over voltage threshold to generate a bias voltage switching signal; and a bias voltage switching circuit, which is configured to operably switch a body bias voltage of the bus switch according to the bias voltage switching signal, wherein when the bus voltage is higher than the over voltage threshold, the bias voltage switching circuit is configured to operably switch the body bias voltage to the bus voltage or else switch the body bias voltage to the second voltage.

9. The power conversion circuit as claimed in claim 8, wherein the plurality of the sub-clamp circuits include: a first bus sub-clamp circuit and a second bus sub-clamp circuit;

wherein the first bus sub-clamp circuit is configured to operably clamp a voltage between the bus node and a gate of the bus switch, so as to clamp a voltage difference between the bus node and the second node to be smaller than a breakdown voltage of the bus switch;

wherein the second bus sub-clamp circuit is configured to operably clamp a voltage between the second node and the gate of the bus switch, so as to clamp the voltage difference between the second node and the bus node to be smaller than the breakdown voltage of the bus switch.

10. The power conversion circuit as claimed in claim 8, wherein the over voltage threshold is smaller than the bus maximum rating voltage.

11. The power conversion circuit as claimed in claim 1, wherein the plurality of the conversion switches include: a first high side switch, a second high side switch, a first low side switch and a second low side switch, four of which are connected in series between the second node and a ground node; wherein the at least one conversion capacitor includes a first conversion capacitor;

wherein in the power conversion mode, the plurality of the conversion switches are configured to operably control a first end of the first conversion capacitor to periodically switch between the first node and the second node and control a second end of the first conversion capacitor to periodically switch between the first node and the ground node, such that in a steady state, a voltage across the first conversion capacitor is ½ of the second voltage and the first voltage is ½ of the second voltage.

12. The power conversion circuit as claimed in claim 11, wherein the at least one of the plurality of the conversion switches in the group of switches include one of following:

the first high side switch;

the first high side switch and the second high side switch; or the first high side switch, the second high side switch and the first low side switch.

13. The power conversion circuit as claimed in claim 11, wherein the power conversion circuit is further configured to operably switch an inductor, wherein the inductor is coupled between the first node and a switching node, wherein a portion of the plurality of the conversion switches are coupled to the switching node;

wherein in a steady state, a voltage across the at least one conversion capacitor is 1/P-fold of the second voltage, wherein P is a real number greater than one;

wherein the plurality of the conversion switches are configured to operably switch the at least one conversion capacitor and the inductor periodically, so as to perform power conversion between the first voltage and the second voltage in an at least three-level pulse width modulation (PWM) scheme.

14. The power conversion circuit as claimed in claim 1, wherein in the power conversion mode, the respective drain-gate clamp voltage is greater than a maximum of the respective drain-gate voltages of the respective corresponding switches of the group of switches during periodical switching for power conversion.

\* \* \* \* \*